United States Patent [19]

Bowman, Jr.

[11] Patent Number: 4,678,075
[45] Date of Patent: Jul. 7, 1987

[54] OVERHEAD CONVEYOR CLEANING APPARATUS

[76] Inventor: John H. Bowman, Jr., 9723 S. Meade, Oak Lawn, Ill. 60453

[21] Appl. No.: 819,793

[22] Filed: Jan. 16, 1986

[51] Int. Cl.[4] .............................................. B65G 45/00
[52] U.S. Cl. .................................... 198/496; 15/21 B; 15/246; 15/256.5; 104/280
[58] Field of Search ................... 15/21 B, 246, 256.5; 474/92; 198/494, 496; 104/279, 280

[56] References Cited

U.S. PATENT DOCUMENTS

| | | |
|---|---|---|
| 574,621 | 1/1897 | McColloch et al. . |
| 575,520 | 1/1897 | Grupelli ................................ 474/92 |
| 1,111,752 | 9/1914 | Lichtenstein et al. ............... 198/496 |
| 1,883,223 | 10/1932 | Wood . |
| 1,942,590 | 1/1934 | Binger .................................. 198/496 |
| 2,083,864 | 6/1937 | Puckett . |
| 2,804,194 | 8/1957 | Carlson et al. ................. 198/496 X |
| 2,915,019 | 12/1959 | Tieman . |
| 3,229,808 | 1/1966 | Olson . |
| 3,249,211 | 5/1966 | Gray . |
| 3,434,273 | 3/1969 | Lovell . |
| 3,643,785 | 2/1972 | Bostedt . |
| 3,858,715 | 1/1975 | Brock et al. ........................ 198/496 |
| 3,935,610 | 2/1976 | Vogt et al. . |
| 4,091,492 | 5/1978 | Thomson et al. . |
| 4,176,429 | 12/1979 | Rottensteiner . |
| 4,416,367 | 11/1983 | Easton et al. . |
| 4,514,872 | 5/1985 | Hopkins . |

FOREIGN PATENT DOCUMENTS

| | | |
|---|---|---|
| 673721 | 3/1939 | Fed. Rep. of Germany ...... 198/494 |
| 11285 | of 1897 | United Kingdom . |
| 11606 | of 1898 | United Kingdom . |
| 24334 | of 1898 | United Kingdom . |
| 765866 | 1/1957 | United Kingdom . |

OTHER PUBLICATIONS

Industrial Finishing, Part II, Equipment, pp. 5, 56, Nov. 1984.

*Primary Examiner*—Jeffrey V. Nase
*Attorney, Agent, or Firm*—Dressler, Goldsmith, Shore, Sutker & Milnamow, Ltd.

[57] ABSTRACT

A cleaning apparatus for an overhead conveyor system is disclosed which provides continuous cleaning of the system for smooth, trouble-free operation. The apparatus preferably includes one or more exteriorly-mounted wire brush assemblies which are arranged on the guiderail of the conveyor system for operative cleaning engagement with the movable conveyor. A threaded adjustment arrangement is preferably provided so that the pressure exerted on the conveyor by the cleaning brushes can be selectively varied. For conveyors comprising an enclosed, box-section guide rail, the present apparatus is preferably configured to include a tension-carrying internal brush assembly which is integrated into the conveyor itself. In the preferred form, cleaning engagement is effected between the exteriorly-mounted brushes and the tension-carrying internal brush whereby the internal brush is periodically cleaned.

14 Claims, 8 Drawing Figures

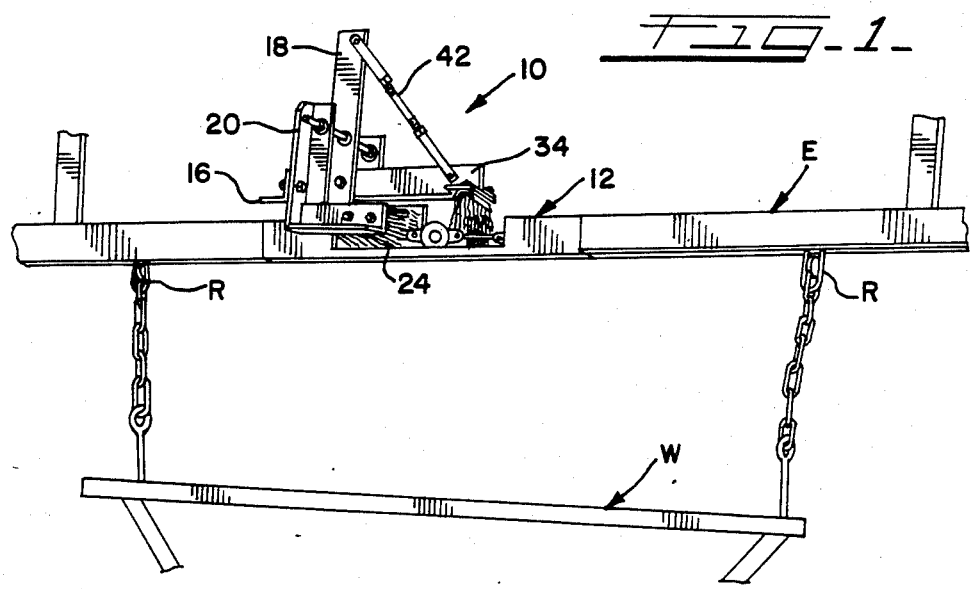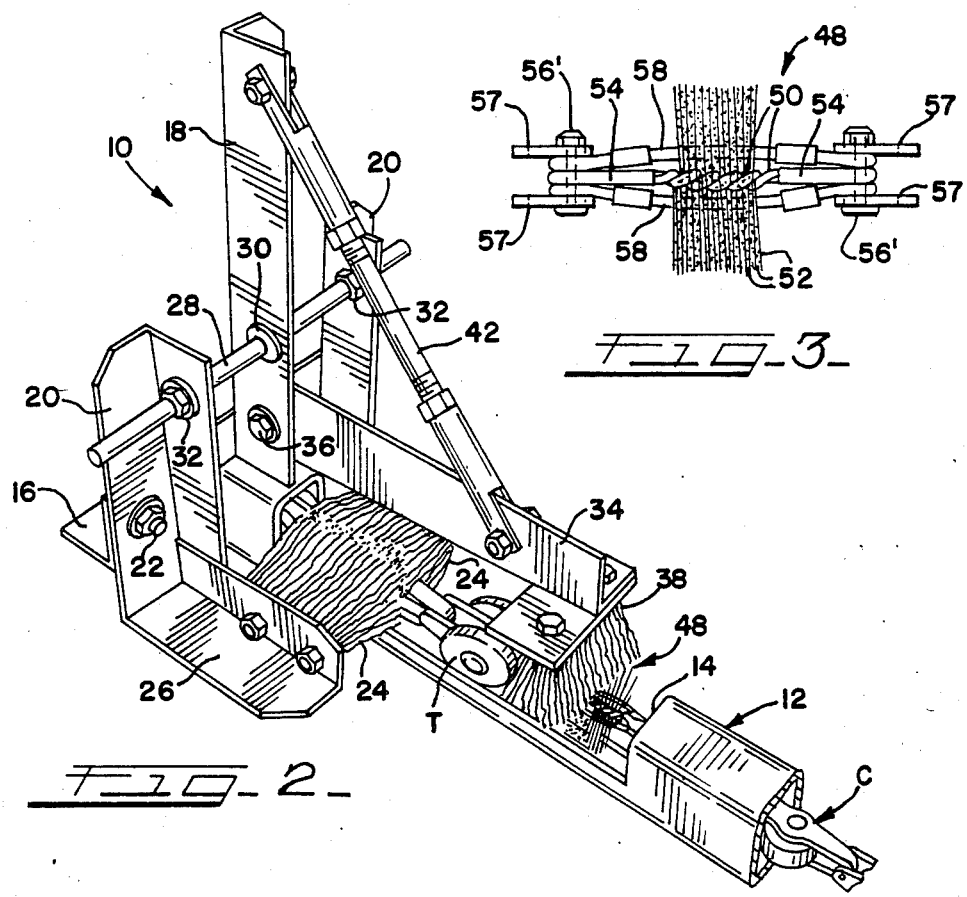

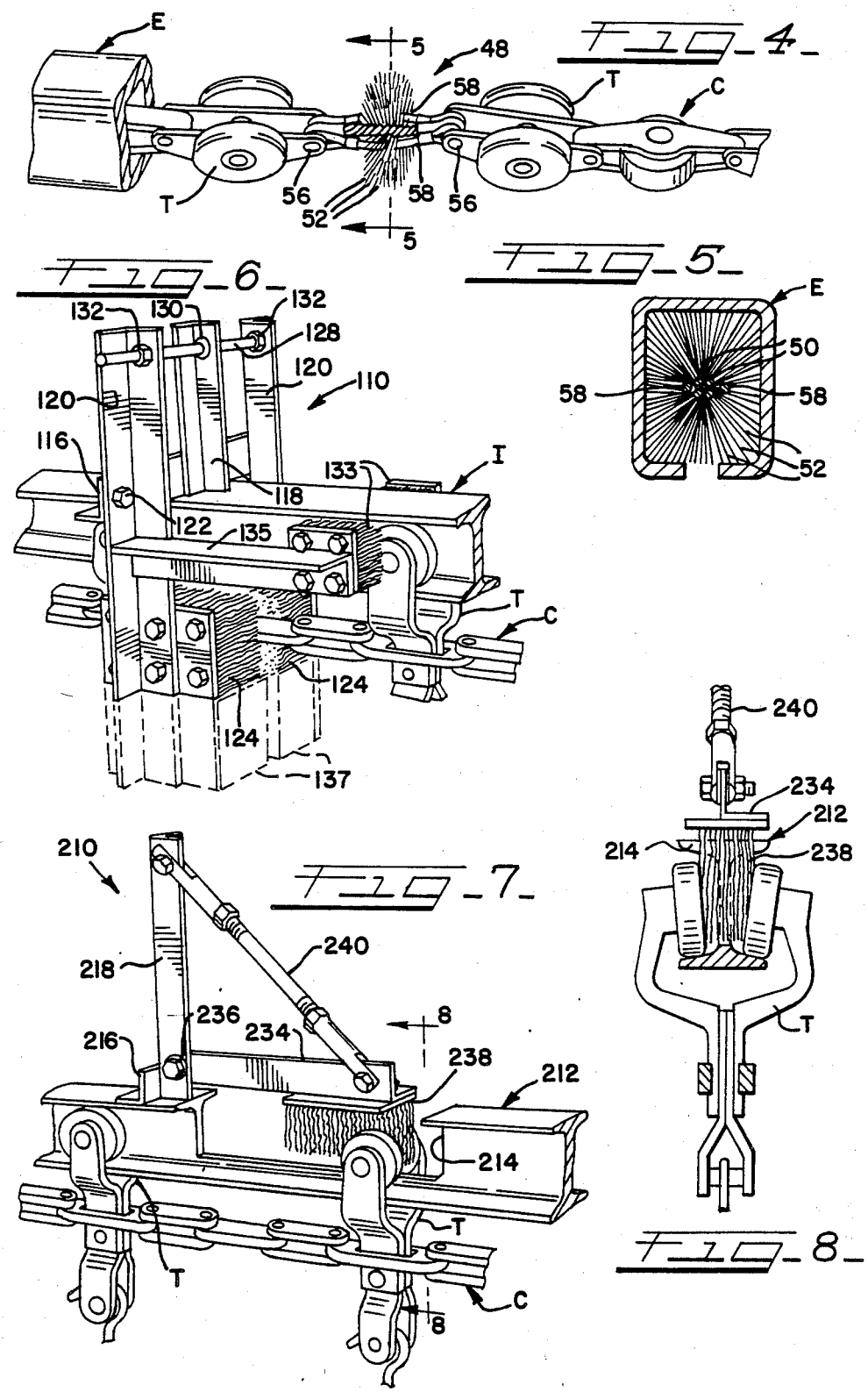

OVERHEAD CONVEYOR CLEANING APPARATUS

TECHNICAL FIELD

The present invention relates generally to an apparatus for cleaning an overhead power conveyor system, and more particularly to a cleaning apparatus including one or more adjustably positionable cleaning brushes for effecting continuous cleaning of a conveyor as it moves, as well as an internal brush assembly for incorporation into the conveyor for cleaning the interior of an enclosed conveyor guide rail.

BACKGROUND OF THE INVENTION

Overhead power conveyor systems are very widely used in all manner of manufacturing and material handling operations. Conveyor systems of this type typically include a suspended guide rail, which may comprise an I-beam, T-beam, or box-section, and a articulable conveyor carried by the guide rail. The conveyor typically comprises wheeled trolley elements which engage and ride in or on the guide rail, and flexible linkage means, such as a cable or chain links, which interconnect the trolleys. Carrier elements are typically connected to the trolleys and depend beneath the guide rail so that articles to be conveyed can be readily attached to the conveyor. These types of conveyors are extremely versatile in that they can be arranged to extend angularly upwardly and downwardly, as well as in curved or circuitous routes.

As will be appreciated, efficient operation of overhead conveyor systems calls for regular maintenance to avoid excess accumulation of dirt and debris on the guide rail and conveyor. However, considering that it is not unusual for a typical system to extend for hundreds or thousands of feet, effective cleaning of the conveyor system can be extremely time-consuming. Nevertheless, smooth, efficient operation of the conveyor requires that build-up of debris be avoided.

While for many overhead conveyor systems efficient cleaning principally facilitates smooth operation, the deleterious effects of debris accumulation can be significant in conveyor systems used in connection with painting operations, and more particularly, electrostatic painting. In painting operations of this nature, a voltage potential is established between a paint-dispensing nozzle and an article receiving paint, whereby the paint spray or droplets are electrostatically attracted to and coat the article. This type of painting is recognized as desirably avoiding waste since paint "overspray" is abated.

In a typical electrostatic painting operation employing an overhead conveyor for transport of the articles being painted, it will be appreciated that the conveyor system itself plays an integral role in establishing the desired electrical voltage potential between the paint and the article. Ordinarily, the conveyor system comprises part of the potential-establishing circuit, with the metallic components of the conveyor (i.e., the guide rail, trolleys, carrier elements, etc.) acting to establish the electrical potential for articles conveyed thereby.

Thus, it will be appreciated that in an electrostatic painting environment the implications of effectively cleaning the conveyor system go beyond smooth and trouble-free operation; effective cleaning is required so that components of the movable conveyor are and remain effectively grounded to the guide rail during painting operations. A loss of ground owing to a buildup of debris, such as paint, grease, and the like, results in less efficient painting of the article, wasted paint and concomitant pollution of the environment.

In the past, various attempts have been made to perfect effective conveyor cleaning devices. For example, one previous device comprises power-driven rotary brushes arranged to contact surfaces of the conveyor as it moves along its guide rail. However, experience has shown that not only is this particular device ineffective in providing the desired cleaning, the rotating brush assemblies undesirably tend to "sling" debris from their surfaces onto the products being carried by the conveyor and work spaces below. Further, the power-driven nature of such a device adds to the expense of its initial installation and subsequent operation.

In view of the efficient operation which is promoted by effective cleaning of an overhead conveyor system, it is highly desirable to provide a conveyor cleaning arrangement which is readily installed, reliable and effective in operation, and economical to use.

SUMMARY OF THE INVENTION

In accordance with the present invention, a cleaning apparatus for an overhead power conveyor system is disclosed which has been particularly configured for ease of installation and reliable operation, convenient adjustment for optimal cleaning, and economical and trouble-free use. Generally, the present apparatus includes one or more conveyor-engaging brushes adjustably mounted on the exterior of the conveyor guide rail for continuous cleaning engagement with the associated conveyor as it is moved relative to the guide rail.

In an embodiment of the present invention particularly suited for use with an enclosed, box-section-like guide rail, the present apparatus further includes a tension-carrying internal brush assembly which is integrated into the conveyor itself between spaced apart portions thereof. The internal brush assembly is configured for cleaning the interior surfaces of the enclosed guide rail, with the apparatus preferably arranged such that the exteriorly-mounted cleaning brushes contact and engage the internal brush assembly, and thus cooperate therewith for effecting periodic cleaning of the internal brush.

The cleaning apparatus of the present invention is configured for use with an overhead conveyor system including a suspended guide rail, and a conveyor movable along the rail. The present apparatus is adaptable for use with guide rails configured as an I-beam, T-section, enclosed box-section (either circular or rectangular), and for use with typical conveyors including a plurality of interconnected wheeled trolleys joined by flexible cable, chain links, or the like. The present apparatus can be used with continously moving conveyor systems, as well as with so-called "power and free" systems.

The present apparatus first includes a main support structure configured for fixed mounting on an upper surface of the conveyor guide rail. In a preferred embodiment, the main support structure comprises a transverse support member which may extend transversely of and beyond the guide rail, and a vertical support member which extends upwardly from the upper surface of the guide rail.

The present apparatus further includes at least one generally elongated support arm pivotally mounted on the main support structure by fulcrum connection means.

Continuous cleaning of the associated conveyor is effected by the provision of at least one wire brush construction mounted on a free end portion of each support arm in spaced relation to the fulcrum means thereof. The wire brush comprises a plurality of juxtaposed wire elements or bristles engageable with the conveyor as the conveyor moves relative to the guide rail and the wire brush.

The present apparatus further includes a threaded adjustment means operatively connected to and extending between the main support structure and each of the support arms which is provided. The threaded adjustment means is selectively adjustable to move the support arm about its fulcrum connection means, to thereby vary the pressure exerted on the conveyor by the wire brush. In this manner, the wire brush effects continuous cleaning of debris from the conveyor as the conveyor moves along its guide rail.

In one form of the present invention, a pair of generally vertically oriented, pivotally movable side support arms are provided which are respectively pivotally joined to the transverse support member of the main support structure generally at opposite ends thereof. In this form of the invention, each support arm is preferably pivotally joined to the main support member intermediate the ends of the support arm.

The threaded adjustment means of the construction comprises a transversely extending threaded shaft operatively connected to each of the support arms, and to the vertical support member of the main support structure. Each of the support arms is provided with its own wire brush, with the pair of wire brushes arranged in opposing relation relative to the movable conveyor. By this construction, the threaded shaft permits convenient and positive pivotal adjustment of the support arms to permit the pair of opposed brushes carried thereby to be urged against opposite sides of the movable conveyor with substantially equal force. Experience has shown that each brush is preferably urged against the conveyor with sufficient force to actually deflect the conveyor from its ordinary path; use of cooperating opposed brushes thus provides the desired degree of cleaning engagement without undesired deflection of the conveyor.

The present cleaning apparatus can also be configured to comprise an upper support arm which extends from the main support structure above the conveyor guide rail in generally parallel relation to the direction of movement of the conveyor. In this form of the invention, the upper support arm includes one end pivotally connected to the main support structure by fulcrum connection means, and an opposite free end. An upper wire brush is mounted on the free end of the upper support arm for cleaning engagement with the movable conveyor. Threaded adjustment means in the form of a clevised turnbuckle is provided which extends between the afore-said vertical support member and the upper support arm for pivotally moving the upper arm relative to the support. In this manner, selective adjustment of the pressure exerted on the conveyor by the upper brush is accommodated.

While embodiments of the present invention are particularly suited for use with a conveyor system comprising an I-beam guide rail, the present apparatus can be configured to include a tension-carrying internal brush assembly for effecting cleaning of the interior surfaces of an enclosed, box-section guide rail. In essence, the internal brush assembly replaces an existing portion of the driven conveyor, and is configured to carry the normal (and in some instances substantial) tensile loads exerted on the conveyor.

To this end, the internal brush assembly includes a central member comprising a plurality of entwined coil elements from between which extend a plurality of juxtaposed wire elements. The assembly further preferably includes at least one secondary tension-carrying member which acts to prevent unacceptable elongation and deformation of the entwined-coil central member. Significantly, the cross-sectional exterior dimensions of the internal brush assembly correspond and are complementary to the interior cross-sectional dimensions of the enclosed guide rail. In this manner, the free end cross-sectional surfaces of the juxtaposed wire elements are engageable with the internal surfaces of the enclosed guide rail as the conveyor moves therewithin, with this configuration imparting a vibratory-like "walking" action to the wire elements. Highly effective cleaning of the interior of the enclosed guide rail is thus achieved. In the preferred form, the internal brush assembly is moved through an open rail section of the guide rail whereat one or more of the exteriorly-mounted brushes are provided for cleaning engagement with the internal brush assembly, to thus periodically effect cleaning thereof.

Numerous other features and advantages of the present invention will become readily apparent from the following detailed description, the accompanying drawings, and the appended claims.

BRIEF DESCRIPTION OF THE DRAWINGS

FIG. 1 is a perspective view of an overhead conveyor system having an enclosed guide rail provided with a cleaning apparatus embodying the principles of the present invention;

FIG. 2 is a further perspective view of the present conveyor cleaning apparatus shown in FIG. 1 illustrating a form of the apparatus particularly suited for use with a conveyor system having an enclosed guide rail;

FIG. 3 is a side elevational view of an internal brush assembly of the present apparatus configured for effecting cleaning of the interior of an enclosed guide rail of a conveyor system;

FIG. 4 is a further perspective view of the internal brush assembly of the present apparatus showing incorporation thereof into an associated movable conveyor;

FIG. 5 is a cross-sectional view taken along line 5—5 of FIG. 4;

FIG. 6 is a perspective view similar to FIG. 2 illustrating a further embodiment of the present invention particularly suited for use with an overhead conveyor comprising an I-beam guide rail;

FIG. 7 is a perspective view similar to FIG. 6 illustrating a further embodiment of the present apparatus for use with a conveyor system having an I-beam guide rail; and FIG. 8 is a view, in partial cross-section, taken along line 8—8 of FIG. 7.

DETAILED DESCRIPTION

While the present invention is susceptible of embodiment in various forms, there is shown in the drawings and will hereinafter be described presently preferred embodiments of the invention, with the understanding that the present disclosure is to be considered as an exemplification of the invention, and is not intended to limit the invention to the specific embodiments illustrated.

Referring first to FIGS. 1 and 2, therein is illustrated a conveyor cleaning apparatus 10 embodying the principles of the present invention. Cleaning apparatus 10 is shown in conjunction with an overhead power conveyor system (sometimes referred to as a trolley conveyor) which comprises a suspended guide rail and a conveyor C movable along the guide rail. In this illustrated embodiment, the suspended guide rail is shown as comprising an enclosed, box-section-type guide rail E, illustrated as having a generally rectangular cross-sectional configuration. The present apparatus is readily adaptable for use with enclosed guide rails which are otherwise configured, such as of circular cross-section.

The movable conveyor C is movable generally within the guide rail E, and comprises wheeled trolleys T which move along the interior surfaces of the guide rail. A continuous slot is defined at the lower extent of the guide rail, with suitable hanger or carrier elements R depending through the slot from the trolleys T. A workpiece such as W is typically removably supported by the carriers R such as for transport from one portion of an assembly line to another. The specific details of overhead conveyor systems for which the present invention is suited for use will be well known by those familiar with the art.

In the embodiment of the present apparatus shown in FIGS. 1 and 2, an open guide rail section 12 is provided which defines an elongated opening 14 whereat opposed side and upper portions of the rail section have been removed, thus exposing the laterally opposite side surfaces, and upper surfaces of the conveyor C movable within the guide rail. The present apparatus is preferably mounted in operative association with open rail section 12, and may be configured to include the open rail section so that the entire apparatus can be installed merely by interposing the open rail section into an existing guide rail E so that the conveyor moves through the open rail section.

As best shown in FIG. 2, cleaning apparatus 10 preferably includes a main support structure mounted on the upper surface of the conveyor guide rail generally adjacent to opening 14. In this embodiment, the main support structure includes a transverse support member 16 which extends transversely of and beyond the guide rail. The support structure further includes a vertical support member 18 which extends upwardly from the guide rail. Fabrication from suitable welded angle stock is preferred for economical manufacture and durability, but it will be appreciated that a wide variety of specific configurations may be employed in keeping with the principles disclosed herein.

In order to effect continuous cleaning of the laterally opposed, outwardly facing side surfaces of conveyor C, apparatus 10 includes a pair of generally vertically oriented side support arms 20. Side support arms 20 are respectively pivotally connected to opposite end portions of transverse support member 16 by respective fulcrum pivot connections 22 (one being shown).

Each of the pivot connections is preferably provided intermediate the ends of the respective support arm 20 so that outward movement of an upper end portion of each arm acts to urge the lower end portion of each arm inwardly toward the conveyor guide rail. The preferred configuration of support member 16 such that it extends laterally beyond the side of guide rail E desirably positions each support arm 20 in generally spaced relation to the conveyor, thus permitting the desired adjustable movement of the lower end of each arm 20 toward and away from the conveyor.

Cleaning of the exposed side surfaces of conveyor C at open rail section 12 is effected by means of a pair of opposed side wire brushes 24 respectively mounted generally at the lower free end portions of side support arms 20 by respective brush brackets 26 (one shown). Each wire brush 24 comprises a plurality of juxtaposed wire elements or bristles which extend inwardly from the respective brush bracket 26 toward conveyor C. Each brush 24 is preferably configured such that its conveyor-engaging face extends from the lower edge of opening 14 upwardly beyond the upper surfaces of the conveyor C.

Experience has shown that effective cleaning of conveyor C calls for relatively substantial pressure to be exerted on the conveyor by the wire brushes 24. In fact, it has generally been found that the pressure which is exerted on the conveyor by each brush is sufficient to deflect the conveyor from its ordinary path of travel in the event that but a single brush were employed. Thus, the use of opposed, cooperating brushes 24 permits application of the desired substantial pressure for effective cleaning, yet avoids undesired deflection of the conveyor C from its ordinary path.

In order to facilitate selective adjustment of the brushes 24, apparatus 10 includes a threaded adjustment arrangement comprising a transversely extending threaded shaft 28. In the illustrated embodiment, threaded shaft 28 is operatively connected with each of the side support arms 20 above the respective fulcrum pivot connections 22, and thus opposite the connections 22 relative to the respective brushes 24. The threaded shaft 28 is preferably suitably anchored at 30 to vertical support member 18 of the main support structure such that the shaft 28 can rotate with respect to support member 18, but is fixed against axial movement with respect thereto. Opposite end portions of the threaded shaft 28 are provided with screw threads, with a plurality of locking nuts 32 fitted to the screw threads in operative engagement with the side support arms 20.

This construction provides a number of desirable features for the present apparatus. The construction is desirably straightforward for economical manufacture, reliable operation, and convenient adjustment. The provision of adjustment screw threads desirably provides a significant mechanical advantage for urging each of the support arms 20 about its respective fulcrum pivot, thus urging the respective brush 24 into positive cleaning engagement with the conveyor C. The arrangement further permits the two opposed brushes 24 to be very conveniently adjusted so that they exert substantially equal force on the conveyor, thus avoiding undesired deflection of the conveyor as it is moved relative to the brushes. If desired, the threaded adjustment shaft can be fitted with suitable sliding-nut couplings on right-hand and left-hand threaded end portions of the shaft. Each sliding nut coupling can then be operatively connected with a respective one of the support arms 20, whereby rotation of the threaded shaft 28 effects conjoint, cooperative inward and outward movement of wire brushes 24.

With further reference to FIG. 2, apparatus 10 can be configured to include an upper support arm 34 which extends from vertical support member 18 above opening 14 in open rail section 12 in generally parallel relation to the direction of movement of the conveyor C. Upper support arm 34 includes a first end pivotally connected to the support member 18 by a respective upper fulcrum pivot connection 36, and an opposite free end.

An upper wire brush 38 is mounted on the free end of upper support arm 34 in depending relation with respect thereto for cleaning engagement with generally upwardly facing exposed surfaces of conveyor C. In accordance with the present invention, selectively adjustable positioning of support arm 34 for varying the pressure exerted on conveyor C by brush 38 is accommodated by the provision of threaded adjustment means comprising a clevised turnbuckle 42 which extends in a strut-like manner between vertical support member 18 and upper support arm 34.

While the particular configuration of opposed wire brushes 24 and upper wire brush 38 can be varied while keeping with the principles disclosed herein, it is presently preferred that the brushes comprise crimped wire elements preferably on the order of 30 gauge. The wire preferably comprises a relatively high-carbon steel having a carbon content on the order of 0.55 to 0.75 percent, and is preferably of sufficient temper to resist significant permanent deformation attendant to continuous cleaning engagement with the moving conveyor C. Tensile strength on the order of 300,000 to 380,000 pounds per square inch is preferred.

While it is preferred that the wire selected for the brushes be sufficiently hard to avoid excessive wear, it is important that the wire hardness be selected to be less than that of the conveyor components in order to avoid excessive wear of the conveyor attendant to cleaning. The preferred crimped configuration of each wire element is believed to best provide the desired cleaning action in view of the large number of contact points which are established between the crimps or convolutions in the wire elements and the irregular exposed surfaces of the conveyor C.

With particular reference now to FIGS. 3, 4, and 5, therein is illustrated an internal brush assembly 48 of the present apparatus which has been particularly configured for effecting cleaning of the interior surfaces of an enclosed conveyor guide rail such as E. Notably, internal brush assembly 48 is configured for integration or incorporation into the movable conveyor C, and acts as a tension-carrying component of the conveyor.

To this end, brush assembly 48 includes a plurality of entwined coil elements 50 which form a tension-carrying central member of the assembly. The assembly further includes a plurality of juxtaposed wire elements 52 which extend outwardly from between the entwined coils 50.

As best shown in FIG. 3, entwined coils 50 extend between and are permanently affixed to a pair of connecting members 54 of the assembly 48. Connecting members 54 are in turn respectively connected to a pair of end links 56 for connecting the brush assembly to spaced apart portions of the conveyor C. It will be noted that in FIG. 3, end links 56' are illustrated, each comprising a hardened fastener assembly, with hardened, slotted link plates 57 further provided for integration of the brush assembly 48 into the associated conveyor. As will be recognized by those familiar with the art, the particular configuration of the connecting end links for the brush assembly 48 will depend upon the type of conveyor with which the brush assembly is used.

In normal operation of an overhead conveyor system, relatively substantial tensile forces are created within the movable conveyor. During normal running, tensile forces on the order of 200 pounds are common, with forces on the order of 600 pounds being typical during initial start-up of the conveyor. In the event that a jam or like malfunction should occur, tensile forces can very quickly increase by an order of magnitude, and can be as high as 6,000 pounds.

Naturally, the tension carrying internal brush assembly 48 must be configured to carry the varying tensile loads typically exerted on the conveyor. Further, excessive elongation of the brush assembly 48 must be avoided since the drive sprockets which are typically employed for driving the conveyor C require engagement with portions of the conveyor positioned in predetermined spaced relation to each other. Therefore, in order to avoid detachment of connecting members 54 from coils 50, or swaging compression and deformation of wire elements 52 by the entwined coils 50, brush assembly 48 preferably comprises at least one secondary tension-carrying member 58.

In the illustrated embodiment, a pair of secondary members 58 are provided each comprising a flexible, single-leg steel cable sling having opposite ends thereof respectively connected with end links 56, 56'. The provision of secondary tension-carrying members 58 in the form of steel cable slings is preferred in that excessive tensile loading of the central member of the brush assembly is avoided, as is failure of the secondary members 58 attendant to bending stresses exerted thereon as the conveyor C is moved about curves and bends in its guide rail.

In distinction from previously-described opposed brushes 24 and upper brush 38, wire elements 52 of the internal brush assembly are preferably in the form of uncrimped wire, since wire elements 52 principally effect cleaning engagement with the smooth, regular internal surfaces of the guide rail with the free end portions of the wire elements. Other characteristics of the wire elements are preferably as described above for the externally-mounted brushes. Wire hardness is preferably selected to be less than the associated enclosed guide rail E to avoid unacceptable wear of the rail.

The particularly preferred dimensioning and configuration of internal brush assembly 48 has been found to be very significant in providing the desired cleaning action for the interior of the enclosed guide rail. As best shown in FIG. 5, the cross-sectional exterior dimensions of the internal brush assembly are selected to correspond to the interior cross-sectional dimensions of the enclosed guide rail E. By this arrangement, each of the wire elements 52 extends substantially normally to the central member of the brush assembly, with the cross-sectional surface of the free end of each wire element being arranged for cleaning engagement with the interior surface of the guide rail E. Notably, this configuration has been found to impart a vibratory-like action to the wire elements 52 attendant to movement of conveyor C within the guide rail E. A scrubbing-like "walking" action is the result of this particularly preferred configuration, with debris removed from the interior of the guide rail thus becoming entrained and carried by the juxtaposed wire elements 52.

As best shown in FIG. 2, periodic and regular cleaning of the internal brush assembly 48 is preferably effected by the provision of the one or more exteriorly-mounted brushes 24 and 38 for cooperative cleaning engagement with the wire elements 52 of internal brush assembly 48 as the brush assembly 48 moves with the conveyor C. By this arrangement, suitable debris-collecting means (not shown) provided at the open rail section 12 not only collects debris dislodged from the conveyor by the exterior brushes, but further receives debris cleaned from the interior of the guide rail as internal brush assembly 48 is cleaned by the exterior brushes.

As will be appreciated, continuous, highly effective, and substantially complete cleaning of substantially all of the overhead conveyor system is effected in accordance with the present invention. The continuously-acting nature of the present apparatus not only acts to avoid excessive debris accumulation for effecient conveyor operation, but further desirably precludes the need for periodic shut-down of the conveyor system for cleaning, as has been the typical practice in the past. Naturally, very significant savings result from avoiding labor-extensive manual cleaning, as well as from avoiding non-productive "down time" of the conveyor system.

Referring now to FIG. 6, therein is illustrated an alternate embodiment of the present invention which has been particularly configured for use with a conveyor system comprising an I-beam guide rail I. This type of conveyor typically includes trolleys T having a pair of wheels which ride upon the lower flange of the I-beam guide rail on respective opposite sides of the central web of the I-beam. In this embodiment, elements which generally correspond in function to the previously-described embodiment are so-designated by the reference numerals in the one-hundred series.

As shown in FIG. 6, this modified form of the present apparatus 110 includes a main support structure comprising a transverse support member 116 mounted upon the upper surface of guide rail I, and extending transversely beyond the guide rail. This main support structure further includes a vertical support member 118 extending upwardly from the guide rail. A pair of generally vertically oriented side support arms 120 are provided, and are respectively pivotally connected to opposite ends of transverse support member 116 by respective fulcrum pivot connections 122. As in the previous embodiment, fulcrum pivot connections 122 are provided intermediate the ends of the respective side support arm 120.

In this embodiment, a pair of opposed side wire brushes 124 are respectively mounted on the lower free ends of side support arms 120, and are thus arranged for cooperating cleaning engagement with the movable conveyor C. The desired selective adjustment of the side support arms 120 is accommodated by threaded adjustment shaft 128 which extends transversely of the guide rail. Threaded adjustment shaft 128 is operatively connected with side support arms 120 by locking nuts 132, and is operatively connected with vertical support member 118 at 130 whereby shaft 128 is rotatable, but fixed against axial movement relative to the support member 118.

Notably, this embodiment of the present apparatus includes a further set of offset brushes 133 respectively connected to the side support arms 120 by offset brush brackets 135 (one shown). By this arrangement, the brushes 133 are positioned in vertically spaced and horizontally offset relation to the brushes 124 so that debris cleaned from trolley T of the conveyor C by the upper brushes 133 falls past the lower brushes. For some installations, it can be desirable to provide a further set of opposed brushes 137, shown in phantom line, in vertically aligned relation beneath brushes 124. In this way, the upper brushes 124 can engage and clean chain link portions of the conveyor C, while the lower ones of the brushes 137 can engage and clean the article-supporting carriers and hooks of the conveyor which are joined to the conveyor chain links and trolleys.

A further form of the present apparatus is disclosed in FIG. 7, wherein components corresponding to those previously described are indicated with like reference numerals in the two-hundred series. In this embodiment, cleaning apparatus 210 is shown mounted on an open I-beam rail section 212 defining an opening 214 whereat the upper flange and central web of the I-beam conveyor guide rail have been removed. In this embodiment, a main support structure, comprising a transverse support member 216 and a vertical support member 218, is mounted on the upper surface of the open rail section 212.

Notably, this embodiment of the present apparatus has been particularly configured for effecting cleaning between the paired wheels of each trolley T of conveyor C. To this end, an upper support arm 234 is provided which extends above the opening 214 in open rail section 212, with one end of the support arm 234 pivotally connected to vertical support member 218 at fulcrum pivot connection 236. A free end portion of the support arm 234 has mounted thereon an upper wire brush 238 which depends from the support arm downwardly into the opening 214 defined by the rail section 212.

As best illustrated in FIG. 8, upper brush 238 is preferably of a tapered configuration, and extends downwardly from support arm 234 the depth of opening 214. By this arrangement, the individual juxtaposed wire elements of the brush effect cleaning engagement with the opposed surfaces of the wheels of each conveyor trolley T. The desired selective adjustment of upper support arm 234 and thus brush 238, is effected by means of clevised turnbuckle 240 which extends between and is connected with the vertical support member 218 and the upper support arm 234. In view of the irregular nature of the surfaces engaged by brush 238, the provision of crimped wire elements, such as previously described, is preferred.

Thus, a cleaning apparatus for an overhead conveyor system is disclosed which facilitates highly effective continuous cleaning of the system. As noted above, use of the present system for overhead conveyors used in conjunction with electrostatic painting operations is particularly desirable in view of the enhanced electrical ground which is established for articles being conveyed by the system, thus abating paint overspray and waste, and its concomitant environmental pollution. For all applications, smooth, efficient, trouble-free operation of the associated overhead conveyor is promoted by use of the present apparatus.

From the foregoing, it will be observed that numerous modifications and variations can be effected without departing from the true spirit and scope of the novel concept of the present invention. It is to be understood that no limitation with respect to the specific embodiments disclosed herein is intended or should be inferred. It is, of course, intended to cover by the appended claims all such modifications as fall within the scope of the claims.

What is claimed is:

1. An apparatus for cleaning an overhead conveyor system including a suspended guide rail and a conveyor movable along said rail, said apparatus comprising:

a main support structure configured for fixed mounting on an upper surface of said guide rail;

at least one generally elongated support arm pivotally mounted on said main support structure by fulcrum means and including a free end portion;

wire brush means mounted on each said support arm at the free end portion thereof, said brush means comprising a plurality of juxtaposed wire elements engageable with said conveyor as said conveyor moves relative to said guide rail and said brush means; and threaded adjustment means connected to and extending between said main support structure and each said support arm, said threaded adjustment means being selectively adjustable to move said support arm about said fulcrum means to vary the pressure exerted on said conveyor by said wire brush means, whereby said brush means effects continuous cleaning of debris from said conveyor.

2. A conveyor cleaning apparatus in accordance with claim 1, wherein said main support structure comprises a support member extending transversely of and beyond said guide rail, and said apparatus including a pair of said pivotally movable support arms respectively pivotally joined by respective fulcrum means to said transverse support member generally at opposite ends thereof, each said support arm being generally vertically oriented and pivotally joined to said main support member intermediate the ends of said support arm, said main support structure further comprising a vertical support member extending vertically from the upper surface of said conveyor guide rail, said threaded adjustment means for each said support arm being operatively connected to said vertical support member and to each said supporting arm generally above said respective fulcrum means of each said arm, with said free end portion of each said support arm depending below the respective pivot means, said threaded adjustment means permitting the pair of opposed brush means respectively carried by said support arm to be urged against opposite sides of said movable conveyor with substantially equal force.

3. A conveyor cleaning apparatus in accordance with claim 2, wherein each said support arm carries a generally vertically aligned pair of said wire brush means so that the upper one of said brush means of said pair engages and cleans chain link means of said conveyor, and the lower one of said brush means of said pair cleans article-supporting carriers of said conveyor joined to said chain link means.

4. A conveyor cleaning apparatus in accordance with claim 2, wherein each said support arm carries a pair of said wire brush means arranged in vertically spaced and horizontally offset relation to each other so that debris cleaned by the upper one of said pair falls past the lower one of said pair of brush means.

5. A conveyor cleaning apparatus in accordance with claim 2, including an upper support arm extending from said main support structure above said conveyor guide rail in generally parallel relation to the direction of movement of said conveyor, said upper support arm having one end pivotally connected to said support structure and an opposite free end, said apparatus including an upper wire brush means mounted on the free end of said upper support arm and extending downwardly therefrom for cleaning engagement with said conveyor, said apparatus further including turnbuckle means extending between said vertical support member and said upper support arm for pivotally moving said upper support arm relative to said vertical support member to selectively adjust the pressure exerted on said conveyor by said upper brush means.

6. A conveyor cleaning apparatus in accordance with claim 5, wherein said conveyor rail comprises an enclosed support rail within which said conveyor is movable, said apparatus including tension-carrying internal wire brush means integrated into and forming a portion of said conveyor, said internal brush means being configured to contact and clean the internal surfaces of said enclosed support rail, said support rail defining an open section whereat said opposed brush means and upper brush means are positioned to engage and clean said conveyor and said internal brush means.

7. A conveyor cleaning apparatus in accordance with claim 1, wherein said guide rail of said conveyor system comprises an I-beam defining an open section whereat a portion of an upper flange of said I-beam and a portion of a central web thereof are removed;

said main support structure being positioned adjacent said open section and including a vertical support member extending vertically from the upper flange of said support rail, said support arm extending from said support member above said open section in generally parallel relation to the direction of movement of said conveyor, said wire brush means extending downwardly from said support arm generally into said open section for cleaning between paired trolley wheels of said conveyor, said threaded adjustment means comprising a turnbuckle extending between said vertical support member and said support arm for selectively varying the pressure exerted on said conveyor by said brush means.

8. An apparatus for cleaning an overhead conveyor system including an enclosed guide rail, and a conveyor movable relative to and within said enclosed guide rail, said apparatus comprising:

tension-carrying internal wire brush means integrated into and movable within said guide rail with said movable conveyor, said internal wire brush means comprising a plurality of juxtaposed wire elements extending outwardly from a central tension-carrying member, said wire brush means having cross-sectional exterior dimensions corresponding to the interior cross-sectional dimensions of said enclosed guide rail such that the free end cross-sectional surfaces of said juxtaposed wire elements are engageable with the internal surfaces of said enclosed guide rail as said conveyor moves therewithin;

a pair of end link means at opposite ends of said tension-carrying central member, said link means being connected to opposite ends of said central member and to spaced apart portions of said conveyor; and secondary tension-carrying means extending between and connected with each of said pair of end link means, said secondary tension-carrying means and said central member carrying substantially the entire tensile load extended on said conveyor by power driven movement thereof.

9. A conveyor cleaning apparatus in accordance with claim 8, wherein said central member comprises a plurality of entwined coil elements from between which said wire elements extend outwardly.

10. A conveyor cleaning apparatus in accordance with claim 9, wherein said secondary tension-carrying means comprises flexible cable.

11. A conveyor cleaning apparatus in accordance with claim 8, wherein said enclosed guide rail defines an open section, said apparatus including further brush means mounted on the exterior of said support rail at said open section for contact with said internal brush means for effecting cleaning thereof.

12. An apparatus for cleaning an overhead conveyor system including an enclosed guide rail and a conveyor movable along and generally within said guide rail, said apparatus comprising:

an open conveyor guide rail section configured like said guide rail for interposition into said guide rail so that said conveyor is movable through said open rail section, an upper portion of said open rail section being opened to expose laterally opposite side and upper surfaces of said conveyor;

a main support structure mounted on an upper surface of said open rail section, including a transverse support member extending transversely of and beyond said open rail section, and a vertical support member extending upwardly from said rail section;

a pair of generally elongated side support arms pivotally mounted on respective opposite ends of said transverse support member by respective fulcrum means, each said support arm being generally vertically oriented and pivotally joined to said transverse support member intermediate the ends of the support arm;

a pair of opposed side wire brush means respectively mounted on lower end portions of said side support arms for pivotal movement therewith; each said wire brush means comprising a plurality of juxtaposed wire elements, said pair of brush means being positioned for cleaning engagement with the exposed opposite surfaces of said conveyor as said conveyor moves relative to and through said open rail section;

threaded adjustment means comprising a threaded shaft extending between and operatively connected with said side support arms above the respective fulcrum means thereof, said threaded shaft further being operatively connected to said vertical support member, said adjustment means being selectively adjustable to move said support arms about the respective fulcrum means to permit said opposed brush means to be urged against opposite sides of said movable conveyor with substantially equal force;

an upper support arm extending from said vertical support member above said open rail section in generally parallel relation to the direction of movement of said conveyor, said upper support arm having one end pivotally connected to said vertical support member at respective fulcrum means, and having an opposite free end;

an upper wire brush means mounted on the free end of said upper support arm for cleaning engagement with the exposed upper surface of said conveyor as said conveyor moves through said open rail section; and turnbuckle means extending between and operatively connected with said upper support arm and said vertical support member for selectively moving said upper support arm about the fulcrum means thereof for selectively varying the pressure exerted by said upper brush means on the exposed upper surface of said conveyor as the conveyor moves through said open rail section.

13. A conveyor cleaning apparatus in accordance with claim 12, including tension-carrying internal wire brush means integrated into and movable within said guide rail with said movable conveyor, said wire brush means comprising a plurality of juxtaposed wire elements extending outwardly from a central tension-carrying member, said wire brush means having cross-sectional dimensions corresponding to the interior cross-sectional dimensions of said enclosed guide rail for engagement with the internal surfaces thereof as said conveyor moves therewithin, said opposed side brush means and said upper brush means being engageable with said internal brush means as said internal brush means moves through said open rail section.

14. A conveyor cleaning apparatus in accordance with claim 13, wherein said central member of said internal brush means is connected at opposite ends thereof to a pair of end link means for connection to spaced apart portions of said conveyor, said apparatus including at least one secondary tension-carrying means extending between and connected with each of said pair of end link means, said secondary tension-carrying means and said central member carrying substantially the entire tensile load exerted on said conveyor by driven movement thereof.

* * * * *